(12) United States Patent
Poton

(10) Patent No.: US 7,823,247 B2
(45) Date of Patent: Nov. 2, 2010

(54) WIPER CONNECTOR FOR A MOTOR VEHICLE COMPRISING A SAFETY FASTENER

(75) Inventor: Eric Poton, Pont du Chateau (FR)

(73) Assignee: Valeo Systemes d'Essuyage, La Verriere (FR)

( * ) Notice: Subject to any disclaimer, the term of this patent is extended or adjusted under 35 U.S.C. 154(b) by 538 days.

(21) Appl. No.: 11/566,348

(22) Filed: Dec. 4, 2006

(65) Prior Publication Data

US 2007/0094833 A1    May 3, 2007

Related U.S. Application Data

(63) Continuation of application No. 11/274,874, filed on Nov. 15, 2005, now Pat. No. 7,159,268, which is a continuation of application No. 10/491,819, filed as application No. PCT/FR02/03350 on Oct. 2, 2002, now Pat. No. 6,978,511.

(30) Foreign Application Priority Data

Oct. 15, 2001    (FR)    .................................. 01 13831

(51) Int. Cl.
  *B60S 1/40*    (2006.01)
  *B60S 1/38*    (2006.01)
(52) U.S. Cl. ............. 15/250.32; 15/250.43; 15/250.001
(58) Field of Classification Search .............. 15/250.43, 15/250.201, 250.44, 250.32, 250.361
  See application file for complete search history.

(56) References Cited

U.S. PATENT DOCUMENTS

| | | | | |
|---|---|---|---|---|
| 3,874,020 A | * | 4/1975 | Van Eekelen et al. | 15/250.44 |
| 4,670,934 A | | 6/1987 | Epple et al. | |
| 4,807,326 A | * | 2/1989 | Arai et al. | 15/250.43 |
| 5,145,274 A | | 9/1992 | Schon | |

(Continued)

FOREIGN PATENT DOCUMENTS

DE    2753961    *    4/1979

(Continued)

OTHER PUBLICATIONS

Machine translation of German patent 2753961, published Apr. 1979.*

*Primary Examiner*—Gary K Graham
(74) *Attorney, Agent, or Firm*—Oblon, Spivak, McClelland, Maier & Neustadt, L.L.P.

(57) ABSTRACT

A wiper connector for a motor vehicle intended for the connection and articulation between a wiper arm and a component of a wiper blade is engaged longitudinally from rear to front inside the front end of the arm, which is curved longitudinally towards the rear in the form of a U. The wiper connector includes at least one elastically deformable element for securing the connector in the engaged position inside the front end of the arm and two longitudinal vertical flanks, which are designed to be received between two lateral wings of the blade component. The wiper connector is locked in the engaged position in the arm by a safety fastener mounted so as to be able to move between a closed position, in which it extends with regards to the securing element in order to prevent its elastic deformation, and an open position allowing the disengagement of the connector from the arm.

36 Claims, 3 Drawing Sheets

U.S. PATENT DOCUMENTS

| | | | |
|---|---|---|---|
| 5,611,103 A | 3/1997 | Lee | |
| 5,885,023 A * | 3/1999 | Witek et al. | 403/321 |
| 5,920,950 A | 7/1999 | Young et al. | |
| 6,161,249 A | 12/2000 | Hussaini | |
| 6,263,538 B1 | 7/2001 | Westermann et al. | |
| 6,775,877 B1 | 8/2004 | Broszniowski | |
| 6,978,511 B2 | 12/2005 | Poton | |
| 7,159,268 B2 * | 1/2007 | Poton | 15/250.32 |

FOREIGN PATENT DOCUMENTS

| | | | |
|---|---|---|---|
| DE | 3618326 | | 12/1987 |
| DE | 4323767 | | 1/1994 |
| EP | 0655373 | | 11/1994 |
| EP | 0694459 | * | 1/1996 |
| FR | 2482914 | | 5/1980 |
| FR | 2740090 | | 4/1997 |
| GB | 2019203 | | 10/1979 |
| GB | 2324463 | | 10/1998 |
| GB | 2348118 | | 9/2000 |

* cited by examiner

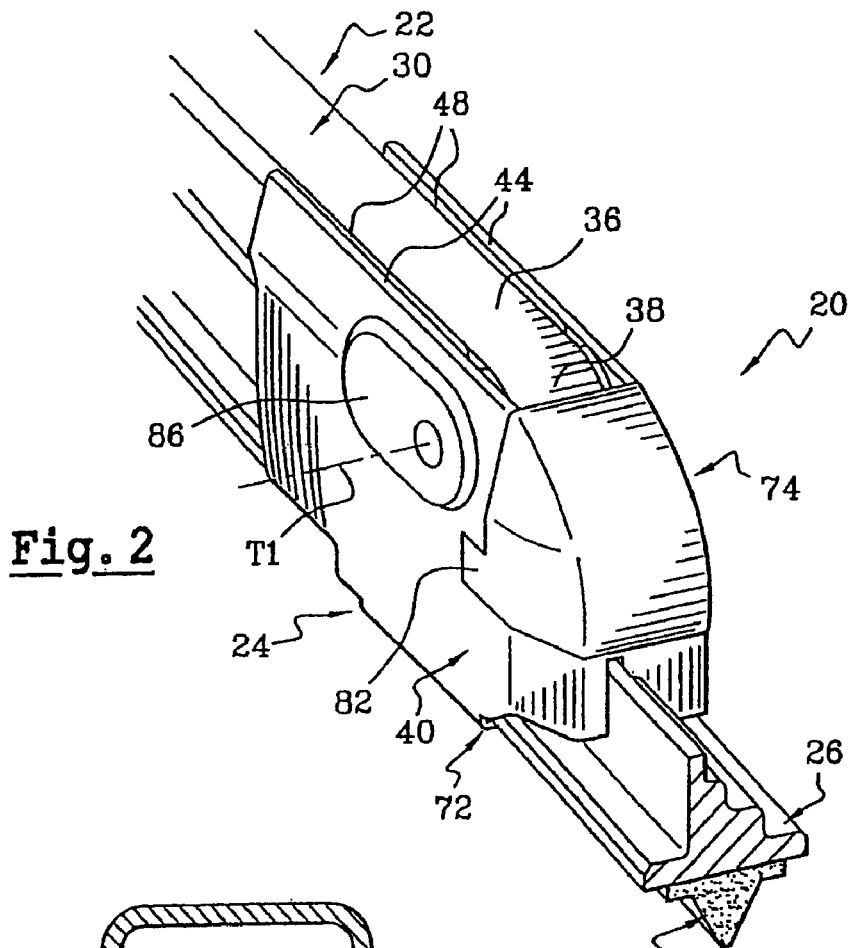
Fig. 2
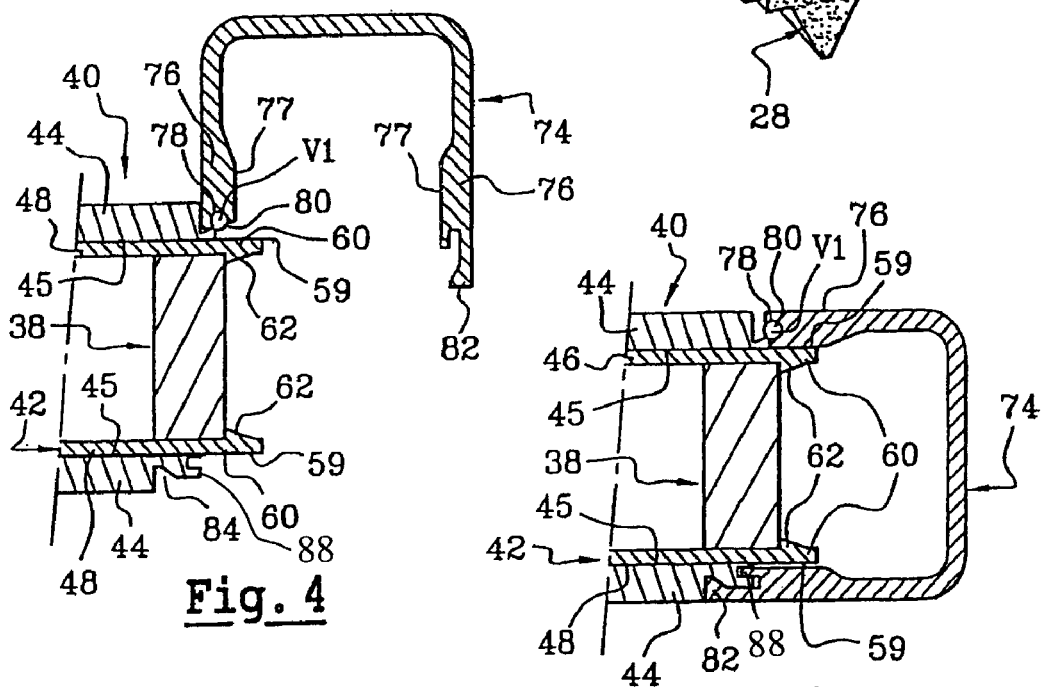
Fig. 4
Fig. 5

WIPER CONNECTOR FOR A MOTOR VEHICLE COMPRISING A SAFETY FASTENER

CROSS-REFERENCE TO RELATED APPLICATIONS

This application is a continuation of U.S. patent application Ser. No. 11/274,874, filed on Nov. 15, 2005, which is a continuation of U.S. patent application Ser. No. 10/491,819, filed on Apr. 6, 2004, now U.S. Pat. No. 6,978,571, which is a National Stage of PCT/FR02/03350, filed Oct. 2, 2002, which claims priority to French Application No. 01 13831, filed Oct. 15, 2001, the entire contents of each of which are incorporated herein by reference.

BACKGROUND OF THE INVENTION

Field of the Invention

The invention concerns a wiper connector for a motor vehicle.

The invention concerns more particularly a wiper connector for a motor vehicle intended for the connection and articulation between a wiper arm and a component of a wiper blade, said connector being engaged longitudinally from rear to front inside the front end of the arm which is curved longitudinally towards the rear in the form of a U, and comprising at least one elastically deformable element for securing the connector in the engaged position inside the front end of the arm, and two longitudinal vertical flanks which are designed to be received between two lateral wings of the blade component.

SUMMARY OF THE INVENTION

The invention also concerns the following elements:
A connexion device between a wiper blade and a wiper arm, and
A wiper blade comprising a support structure on which is mounted a connector according the present invention.
Additionally, the invention is also relative to a motor vehicle wiper.

The method of assembling the blade on the arm is usually known.

The connector is generally elastically fitted on a transverse rod connecting the two longitudinal wings of the components so as to be able to pivot about it, and the front longitudinal end of the arm is curved longitudinally in the form of a U so as to engage between the two flanks of the connector, about a central web with a complementary shape of the connector.

The securing in position of the connector is, in general terms, provided by an elastically deformable element. However, it may happen that, under the effect of an impact, the blade is pushed violently. The securing element is not sufficiently strong and deforms. It can no longer fulfil its securing function, thus allowing accidental disengagement of the connector and thereby a disconnection of the blade from the wiper arm.

According to a design aimed at producing low height wipers, the articulated structure of the wiper blade which carries the wiper scraper or rubber is omitted and it is for example the vertebrae, or structural reinforcing elements analogous to vertebrae, which are associated with the flexible wiper rubber in order to constitute the wiper blade proper, also referred to as a "flat blade".

This low height blade is also driven in sweep by a suitable mechanism comprising a wiper arm and, given the low height of the structural elements, the connector is fitted on a rod of a component which is an insert piece mounted to the structure of the blade.

There exist many embodiments of insert pieces, such as for example those described and depicted in the document WO-A-00/21811. However, each of these insert pieces can receive only a particular wiper arm profile which is adapted to it.

Thus, whenever one wishes to mount a wiper blade of the "flat blade" type on a conventional vehicle which comprises a standard wiper arm, this mounting is impossible or at the very least requires a specific mounting and articulation assembly, of which all the components are specific.

The object of the invention is therefore to propose a wiper connector intended to be mounted on a wiper blade component and to be locked in the mounted position using a safety fastener. This allows to mount any type of wiper on a standard arm and to have a standard connector ensuring a safety locking of the blade on the wiper arm.

For this purpose, the invention proposes a wiper connector of the type described above and presenting the claimed characteristics.

According to other characteristics of the invention:
the fastener is mounted to be movable with respect to the blade component;
the fastener is mounted articulated with respect to the blade component;
the fastener is mounted articulated about a substantially vertical axis of the blade component;
the articulation axis of the fastener is situated close to the front longitudinal end of one wing of the component;
the fastener is held in the closed position by elastic fitting together of complementary shapes;
the securing element is a lug which extends freely and longitudinally towards the front from the front longitudinal end of one flank of the connector, and whose free end comprises a securing nose which extends transversely towards the inside of the connector and which extends with regard to the front side of the front longitudinal end of the arm when the connector is in the engaged position;
the fastener forms a cap which extends in a closed position with regard to an external lateral face of the free end of the locking lug of the connector;
the component is an insert piece mounted on a support structure of the wiper rubber of the blade;
the component is a portion of the main yoke of an articulated support structure for the wiper rubber of the blade;
one of the wings of the component of the blade receives, on an external face, an indicator of the aging of the blade which is initially covered with a protective film which is removed, at least partially, automatically, when the fastener is opened.

Other characteristics and advantages of the invention will emerge from a reading of the following detailed description, for an understanding of which reference will be made to the accompanying figures, amongst which:

BRIEF DESCRIPTION OF THE DRAWINGS

FIG. 2 is a perspective view similar to that of FIG. 1 in which the fastener is in the closed position;

FIG. 4 is a longitudinal section of the wiper according to the invention along a horizontal plane showing the securing of the connector in the engaged position on the inside of the arm;

FIG. 5 is a section similar to that in FIG. 4, in which the fastener is in the closed position.

DETAILED DESCRIPTION OF THE PREFERRED EMBODIMENTS

Figure 1:
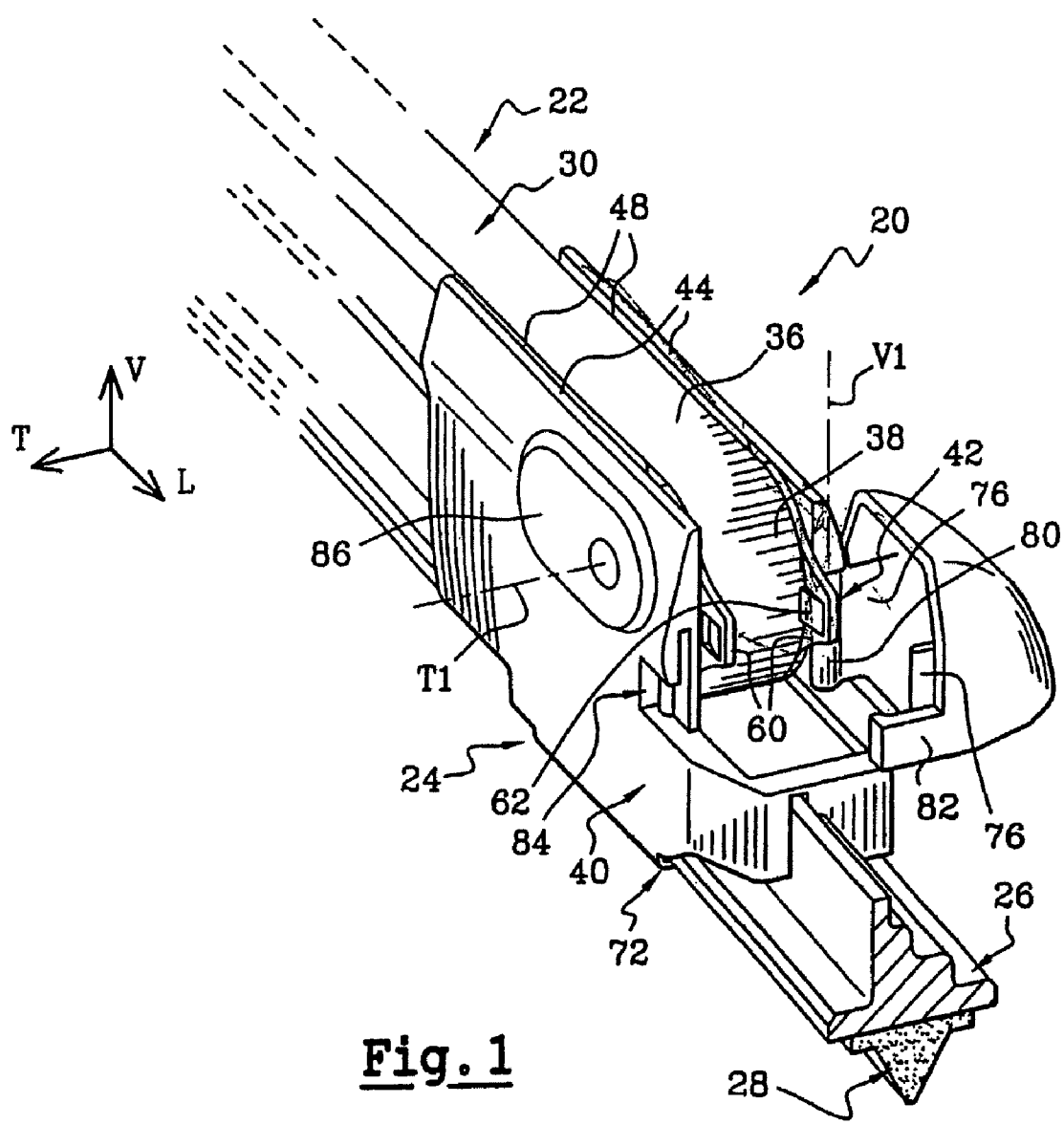
FIG. 1 is a perspective view of a wiper according to the invention in which the fastener is in the open position.
Figure 3:
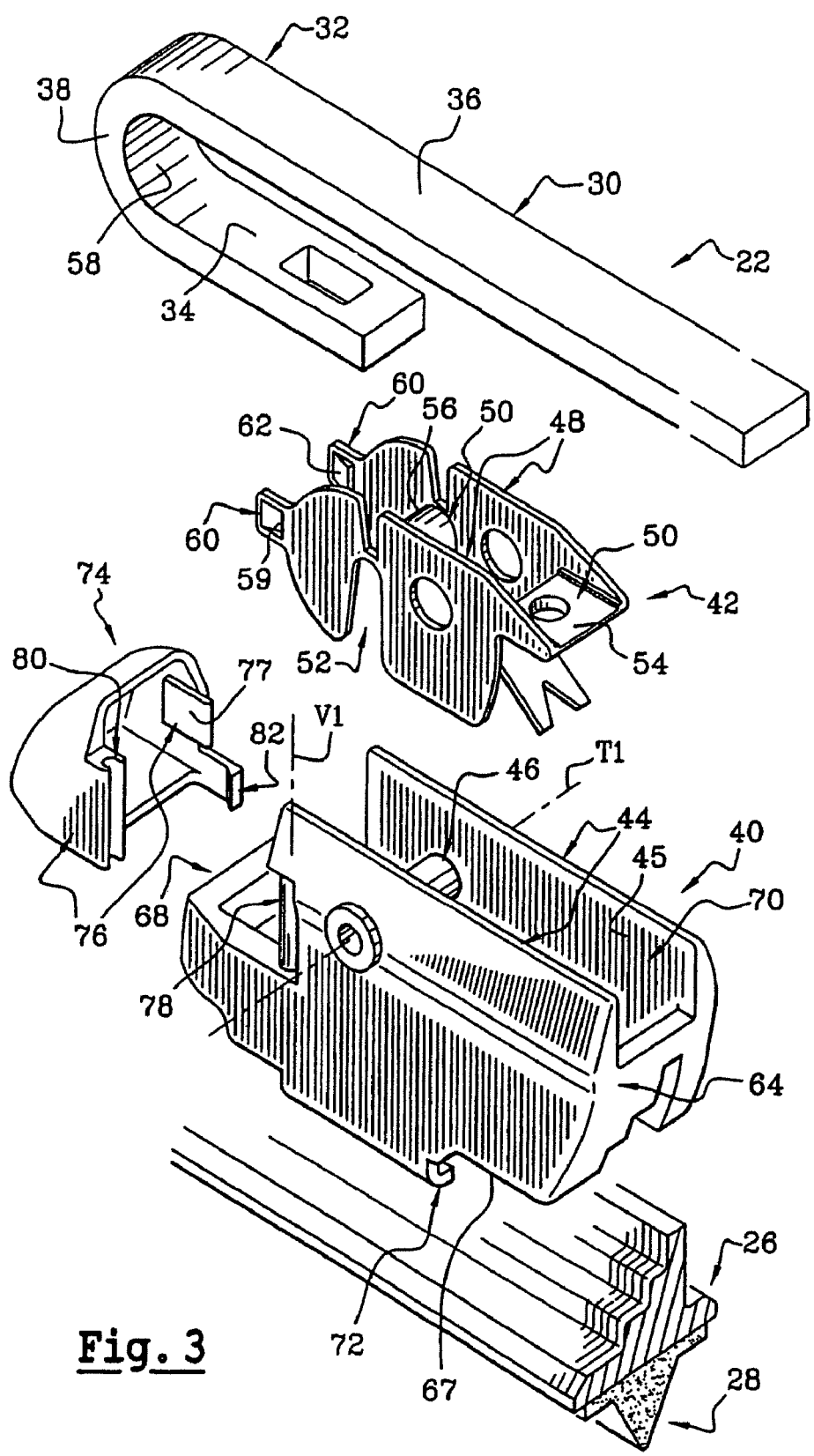
FIG. 3 is an exploded perspective view of the wiper.

For the description of the invention, the orientations vertical, longitudinal and transverse will be adopted non-limitingly according to the reference V, L, T indicated in FIG. 1.

In the following description, identical, similar or analogous elements will be designated by the same reference numbers.

As can be seen in particular in the figures, the main elements and components of the wiper have an overall symmetry of design with respect to a median vertical and longitudinal plane, symmetrical elements being designated by the same references.

The figures show the main components of a wiper 20 produced in accordance with the teachings of the invention.

The wiper 20 comprises principally an arm 22, and a blade 24 consisting in particular of a support structure 26 and a wiper rubber 28.

The wiper arm 22 consists of a flat metallic rod 30 which extends in the overall longitudinal direction "L" of the arm 22 and of the wiper blade 24. The front free end 32 of the arm 22 is in the form of a hook angled in a U and consists of a lower longitudinal branch 34, a top longitudinal branch 36 and a curved connecting branch 38 which extends approximatively over a semicircle.

The blade 24 is here a wiper blade of the "flat blade" type, that is to say a low height wiper blade. The function of the support structure 26 is firstly to press the wiper rubber 28 against the window to be wiped and secondly to drive it in alternating sweeps between two extreme sweep positions in order to wipe the window.

The support structure 26 carries a connecting component 40 which receives means of connection and articulation on the end 32 of the arm 22 about a transverse axis "T1" of a known type which consists principally of a connector 42.

The component 40, which will be described below in detail, comprises mainly two longitudinal and vertical wings 44 connected by a transverse articulation rod 46.

The connector 42 comprises essentially two parallel lateral flanks 48 connected together by a transverse web 50. It is intended to be received between the two internal faces 45 of the wings 44 of the component 40 of the wiper blade 24, and to fit elastically on the articulation rod 46.

To this end, the connector 42 comprises, in each of its flanks 48, a slot 52, substantially vertical and arranged substantially at the centre of the connector 42.

Thus the connector is engaged from top to bottom, between the two wings 44 of the wiper blade 24, until the articulation rod 46 is elastically engaged at the bottom of the slots 52 of the connector 42.

In a known manner, the transverse web 50 which connects the two parallel flanks 48 of the connector 42 has a convex profile complementary to the concave internal profile of the end 32 in the form of a U-shaped hook of the wiper arm 22. The web comprises a first horizontal flat portion 54 which extends longitudinally towards the rear and a second curved front portion 56 intended to at least partially cover the articulation rod 46 and whose shape is complementary to that of the internal face 58 of the curved branch 38 of the hook 32.

The rod 46 provides the articulated mounting of the connector 42 with respect to the wiper blade 24 about the transverse axis "T1".

After having engaged the connector 42 on the rod 46, the assembly of the wiper arm 22 on this sub-assembly 42, 46 takes place, in a known way, by engaging, longitudinally from front to rear, the hook-shaped end 32 on the web 50 of the connector 42, the parallel lateral faces of the rod 30 being received between the flanks 48 of the connector 42.

In such a type of assembly, means of securing by elastic fitting together are provided which longitudinally secure the connector 42 with respect to the arm 22 when the connector 42 is mounted in the engaged position in the hook-shaped end 32.

These automatic securing means consist of two lugs 60 which are each carried by a flank 48 of the connector 24.

Each lug 60 extends longitudinally towards the front from the front edge of the flank 48 which carries it. The free end 62 of this lug 60 is in the form of a nose extending transversely towards the inside of the connector 42 and which is intended to cooperate with the convex face of the curved branch 38 of the hook-shaped end 32.

The component 40 is a piece moulded from a plastics material, with a rectangular parallelepipedal overall shape, which can be produced in one or two parts.

It consists of two parallel lateral wings 44, a rear end 64 and a horizontal flat base 66.

The front face 68 and the top face 70 of the component are open to allow mounting of the connector 42, followed by the arm 22.

The lower face 67 of the base 66 receives connection means for the component 40. These connection means comprise slides 72 which are intended to receive the support structure 26 and which enable the component 40 to be mounted on the support structure 26 by means of a longitudinal sliding. The connection means also comprise means for longitudinal locking of the mounting (not shown in detail), such as for example a locking by elastic fitting together of complementary shapes.

After having fitted the connector 42 in the component 40, the connector 42 is engaged inside the hook-shaped end 32. When the connector 42 is engaged, the lugs 60 deform elastically outwards, because of the inclined shape of the internal lateral faces 62 of the lugs 60, to allow passage of the arm 22 and, when the connector 42 is engaged in the arm 22, the lugs 60 resume their state of rest in order to provide the longitudinal securing of the connector 42 in the engaged position inside the hook 32.

The connector 42 is received between the wings 44 of the component 40 and the lugs 60 are situated in front of the front edges of the wings 44, with a view to avoiding the wings 44 preventing the deformation of the lugs 60 when it is wished to be able to remove the arm 22.

In accordance with the teachings of the invention, the front face 68 of the component 40 is closed off by a safety fastener 74 also forming a housing cap.

The fastener 74 is a hollow piece moulded from plastics material in the form of a cap. It is articulated about a vertical axis V1 of the component and is also mounted so as to be able to move between a closed position of securing the connector 42 in the engaged position inside the hook-shaped end 32 illustrated in FIG. 2 and an open position allowing the disengagement of the connector 42.

The locking of the securing of the connector 42 is provided by the internal faces 77 of the vertical lateral walls 76 of the fastener 74 which extend along the external lateral faces 59 of the lugs 60. Thus the fastener 74 prevents the lugs 60 being deformed transversely towards the outside of the connector 42 and therefore the connector 42 cannot be disengaged from the hook 32.

The fastener 74 participates in the aesthetic appearance and aerodynamics of the whole. To this end, when the fastener 74 is in the closed position, the lateral faces 76 extend in line with the wings 44 of the component 40 so that their external lateral faces are flush with each other.

The articulation axis "V1" of the fastener 74 is situated level with the front edge of a wing 44 of the component 40. The articulation hinge can be produced by a cylindrical element 78 of the component 40 which is covered with an element forming a hook 80 of the fastener 74 comprising a recess complementary to the cylindrical element 78.

The immobilisation of the fastener 74 in the closed position is provided by a lug 82 of the fastener 74, the immobilization lug 82, which extends longitudinally towards the rear from the rear flank of the lateral wall 76 opposite to the lateral wall 76 receiving the element forming a hook 80. The lug 82 fits elastically in a housing 84 in the associated wing 44. Additionally, one of the walls 76 comprises a flange 88 protruding from an inner face 77 of the wall 76.

When a new blade must be mounted on the arm, the component 40 of the worn blade 24 is not kept but is also replaced with a component of the new blade. Thus each component can receive an indicator for defining when the blade is worn. This element is in general terms in the form of a tablet, referred to as an aging indicator 86, placed on an external face of a wing 44 of the component 40.

After the new blade is fitted, it is necessary to remove a protective film from the indicator in order to initialise the detection of aging. It is thus possible to provide for the fastener cap 74 to be closed originally and for its opening to require removal of the protective film.

The wiper 20 has been described as comprising a blade 24 of the "flat blade" type. It is not however limited to this embodiment and may comprise a standard blade 24 of the type in which the support structure 26 comprises a main yoke which carries secondary yokes.

Thus, in the case of a standard blade 24, the component 40 is an element of the main yoke of the support structure 26.

It will be understood that the invention is not limited to this embodiment and that it is possible to use mechanical reversals or simple equivalents.

Thus the fastener 74 may be produced in one piece with the component 40. More precisely, the rear edge of a lateral face 76 of the fastener 74 is connected to the corresponding front edge of the component 40 by a thin strip of material which forms an articulation hinge of axis "V1".

The invention therefore enables to have a modular wiper mounting, that is to say, using standard arm and connector, it is possible to mount any type of wiper blade provided with a component in accordance with the invention, whether or not the blade is of the "flat blade" type. The invention also enables to have a protected mounting without risk of unexpected demounting of the blade.

The invention claimed is:

1. A wiper system for a motor vehicle having a wiper arm, said wiper system comprising:
    a wiper blade;
    a component configured to connect to said wiper blade, said component having a cylindrical element and two lateral wings connected by a transverse articulation rod;
    a connector configured to connect to said component and to said wiper arm, wherein said connector includes two longitudinal vertical flanks, wherein said two longitudinal vertical flanks are configured to be received between said two lateral wings of said component;
    at least one elastically deformable element configured to deform elastically when said wiper arm is engaging with said connector; and
    a housing cap attached to said component at a first portion of said housing cap via an articulation hinge formed by the cylindrical element of the component covered by an element forming a hook of the housing cap comprising a recess complementary to the cylindrical element, and the housing cap is configured to rotate around an axis of the hinge between an open position and a closed position,
    wherein, in said closed position, said housing cap is detachably connected to said component at a second portion of said housing cap, and
    wherein, in said open position, said housing cap is detached from said component at said second portion of said housing cap.

2. A system according to claim 1, wherein, in said closed position, said housing cap is located so as to contact against said wiper arm if said wiper arm is disengaged from said connector.

3. A system according to claim 1, wherein said housing cap comprises an elastically deformable lug configured to elastically deform when moving between said open position and said closed position and configured to immobilize by elastic fitting said housing cap relative to said component in said closed position.

4. A system according to claim 1, wherein, in said closed position, said housing cap is detachably connected to said component without contacting said wiper arm even when said wiper arm is engaged with said connector.

5. A system according to claim 1, wherein, in said closed position, said housing cap is configured to close off a front face of the component.

6. A system according to claim 1, wherein said first and second portions of said housing cap are positioned on a same side of said component relative to said transverse articulation rod of said component.

7. A system according to claim 6, wherein an entirety of said housing cap is positioned on said same side in said open position and in said closed position.

8. A system according to claim 1, wherein said component includes two parts.

9. A system according to claim 1, wherein said wiper blade is a flat blade comprising a support structure connected to said component and a wiper rubber supported by said support structure, and wherein said support structure is free of any articulated structure for supporting said wiper rubber.

10. A system according to claim 1, wherein said housing cap prevents an elastic deformation of said at least one elastically deformable element in said closed position.

11. A system according to claim 1, further comprising said wiper arm.

12. A system according to claim 1, wherein in said closed position, said housing cap closes off the component at least partially, so that said housing cap participates in the aerodynamism of a unit formed by said connector, said wiper arm, and said wiper blade.

13. A system according to claim 1, wherein, in said closed position, outer faces of the housing cap extend in line with outer faces of the component.

14. A system according to claim 1, wherein said component has a standard shape independent of that of the connector, so that said component has an outer appearance substantially independent of said connector.

15. A system according to claim 1, wherein said wiper blade comprises a wiper rubber and a support structure configured to support said wiper rubber, and wherein the component comprises an indentation on a front portion and on a rear portion of the component for passage of the support structure.

16. A system according to claim 1, wherein, in said open position, said wiper arm is disengageable from said connector upon an elastic deformation of said elastically deformable element.

17. A wiper system according to claim 1, wherein said housing cap comprises: a pair of side walls facing each other such that at least a portion of said connector is accommodated between the pair of side walls; a connecting part for connecting said pair of side walls; a lug being releasably mounted to said connector; and a hook to cover a component of the connector.

18. The system of claim 17, wherein one of said side walls comprises a flange protruding from an inner surface of the side wall.

19. A system according to claim 1, wherein, in said open position, said housing cap is detached from said component at said second portion of said housing cap and attached to the component at the first portion via the hinge.

20. A wiper system for a motor vehicle having a wiper arm, said wiper system comprising:
 a wiper blade, wherein said wiper blade is a flat blade comprising a support structure and a wiper rubber supported by said support structure, and wherein said support structure is free of any articulated structure for supporting said wiper rubber;
 a component configured to connect to said support structure of said wiper blade, said component having two lateral wings connected by a transverse articulation rod;
 a connector configured to connect to said component and to said wiper arm, wherein said connector includes two longitudinal vertical flanks, each defining a slot and connected together by a transverse web;
 wherein said transverse web is configured to fit elastically on the transverse articulation rod of said component such that said articulation rod is elastically engaged at a bottom of the slots defined by the two longitudinal vertical flanks of said connector and said two longitudinal vertical flanks are configured to be received between said two lateral wings of said component;
 said system further comprising at least one elastically deformable element configured to deform elastically when said wiper arm is engaging with said connector; and
 a housing cap configured to move between an open position and a closed position, and said housing cap prevents an elastic deformation of said at least one elastically deformable element in said closed position,
 wherein, in said open position, said wiper arm is disengageable from said connector upon the elastic deformation of said elastically deformable element, and
 wherein, in said closed position, said housing cap is detachably connected to said component.

21. A system according to claim 20, wherein, in said closed position, said housing cap is located so as to contact against said wiper arm if said wiper arm is disengaged from said connector.

22. A system according to claim 20, wherein said housing cap comprises an elastically deformable lug configured to elastically deform when moving between said open position and said closed position and configured to detachably connect said housing cap to said component in said closed position.

23. A system according to claim 22, wherein said elastically deformable lug is configured to detachably connect said housing cap to said component in said closed position even when said wiper arm is not engaged with said connector.

24. A system according to claim 22, wherein said elastically deformable lug is configured to detachably connect said housing cap to said component in said closed position without contacting said wiper arm.

25. A system according to claim 20, wherein, in said closed position, said housing cap is detachably connected to said component without contacting said wiper arm even when said wiper arm is engaged with said connector.

26. A system according to claim 20, wherein said component includes two parts.

27. A system according to claim 20, wherein said housing cap is hinged so as to move between said open and closed positions, and wherein said housing cap is not hinged to said connector, nor to said wiper blade.

28. A system according to claim 27, wherein said housing cap is hinged to said component.

29. A wiper system for a motor vehicle having a wiper arm, said wiper system comprising:
 a wiper blade;
 an insert piece configured to connect to said wiper blade, said insert piece having a cylindrical element and two lateral wings connected by a transverse articulation rod;
 a connector configured to connect to said insert piece and to said wiper arm, wherein said connector includes two longitudinal vertical flanks, each defining a slot and connected together by a transverse web,
 wherein said transverse web is configured to fit elastically on the transverse articulation rod of said insert piece such that said articulation rod is elastically engaged at a bottom of the slots defined by the two longitudinal vertical flanks of said connector and said two longitudinal vertical flanks are configured to be received between said two lateral wings of said insert piece,
 said system further comprising at least one elastically deformable element configured to deform elastically when said wiper arm is engaging with said connector; and
 a housing cap attached to the insert piece via an articulation hinge formed by the cylindrical element of the insert piece covered by an element forming a hook of the housing cap comprising a recess complementary to the cylindrical element, and the housing cap is configured to rotate around an axis of the hinge between an open position and a closed position, wherein in said open position said wiper arm is disengageable from said connector upon an elastic deformation of said elastically deformable element, and in said closed position, said housing cap is maintained at a location so as to contact against said wiper arm if said wiper arm is disengaged from said connector,
 wherein said housing cap comprises an elastically deformable lug configured to elastically deform when moving between said open position and said closed position, and wherein said elastically deformable lug is configured, in said closed position, to maintain said housing cap at said location.

30. A system according to claim 29, wherein said wiper arm has a U-shaped front end, said transverse web has a convex profile complementary to a concave internal profile of said U-shaped front end of said wiper arm, said transverse web having a first portion configured to receive a top longitudinal branch of said wiper arm, a second portion configured to receive a curved branch of said U-shaped front end, and a third portion configured to receive a lower longitudinal branch of said U-shaped front end, said connector being configured to connect to said wiper arm such that said U-shaped front end of said wiper arm is received between said longitudinal vertical flanks of said connector.

31. A system according to claim 29, wherein said at least one elastically deformable element is positioned such that said two lateral wings of said insert piece do not prevent an elastic deformation of said at least one elastically deformable element when said connector is connected to said insert piece and to said wiper arm.

32. A system according to claim 29, wherein said housing cap is hinged to said insert piece at a first portion and is connected to said insert piece at a second portion in said closed position, and wherein said first and second portions of said housing cap are located on a same side of said insert piece relative to said transverse articulation rod of said insert piece.

33. A system according to claim 32, wherein an entirety of said housing cap is positioned on said same side in said open position and in said closed position.

34. A system according to claim 29, wherein said housing cap is a hollow piece moulded from plastic material.

35. A system according to claim 29, wherein said insert piece includes two parts.

36. A system according to claim 29, wherein said housing cap prevents an elastic deformation of said at least one elastically deformable element in said closed position.

* * * * *